Figure 1:
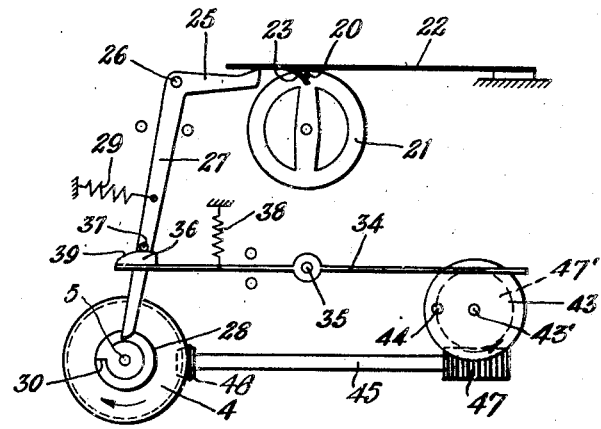

Jan. 23, 1940.  A. WIEDEMEIER  2,188,169

TIME MEASURING MECHANISM

Filed June 3, 1936

INVENTOR
Alfred Wiedemeier
BY Morgan Finnegan & Durham
ATTORNEYS

Patented Jan. 23, 1940

2,188,169

UNITED STATES PATENT OFFICE 2,188,169

TIME MEASURING MECHANISM

Alfred Wiedemeier, Zug, Switzerland, assignor to Landis & Gyr, A. G., a corporation of Switzerland Application June 3, 1936, Serial No. 83,176
In Switzerland June 15, 1935

6 Claims. (Cl. 58—26)

The invention relates to new and useful improvements in time measuring mechanisms and more particularly to such improvements in time measuring mechanisms wherein a synchronous motor and an auxiliary time mechanism, such as a clock, are employed.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Figure 2:
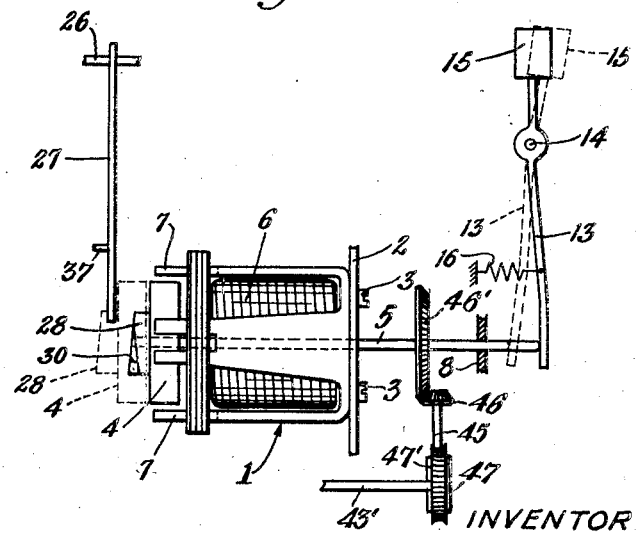

Of the drawing:

Fig. 1 is a diagrammatic view showing a mechanism whereby the synchronous motor controls the operation of the clock mechanism; and Fig. 2 is a diagrammatic view showing part of the mechanism of Fig. 1 looking at same from the right, with the drive for the pin disc from the motor shown displaced from its true position for clarity.

Objects of the invention are to provide reliable and continuously operating novel time measuring mechanism, for use in meters, time switches and other mechanisms, which will continue to function properly irrespective of power failures or fluctuations, or other abnormal conditions; to provide simple and sturdy mechanism of the kind described, operating reliably and efficiently and with only minimum energy consumption; to provide such a mechanism wherein a synchronous motor and a clock are alternatively called into operation through simple and efficient control of the clock mechanism by the synchronous motor when power line conditions so require; to provide means wherein the rotative energy or inertia of the synchronous rotor is employed to bring the clock mechanism into action, and wherein the motor energy is used to cut out the clock mechanism upon the motor returning to synchronous speed; to provide means which will assure that the auxiliary mechanism will go into operation on failure or such disturbance of the circuit as would impair or stop the reliable operation of the synchronous motor; to provide mechanism wherein the rotative power of the rotor is employed to positively start the time escapement and the escapement is stopped by the rotative energy of the motor as it comes up to speed.

In the accompanying drawing, the invention has been illustrated diagrammatically for the sake of clearness in showing, as in the commercial structure this mechanism is closely incorporated with other mechanisms, not covered by the present application, and is difficult to show in a commercial form. The invention is widely applied in meter mechanism wherein there are driving connections from a meter to a registering device, a time switch or both, and a like drive from a time measuring mechanism, either current driven or auxiliary. Usually there is a driving train from a meter to a register or settable switch, a time mechanism drive onto the register or settable switch, which time mechanism may be of the kind herein described, and the drive from the time devices may be of the type transmitting the greater time drive velocity coming from either the motor or the clock. The present invention may likewise be incorporated with other kinds and types of energy meter mechanisms.

In the embodiment of the invention illustrated by way of example in the accompanying drawing, a synchronous motor 1 is shown, supported on a frame 2 by suitable means such as screws 3. The rotor 4 of the motor is mounted on a shaft 5 which extends axially between the poles 7 and within and through the winding 6, the shaft projecting rearwardly beyond the frame 2 and preferably having an additional bearing 8 in the frame structure, and it may have other bearings as well. When the motor is energized, the axially acting magnetic force of the field moves the rotor and shaft to the full line position shown in Fig. 2 of the drawing, and the rotor and shaft are retained in that position while the motor is running synchronously. Means are provided for returning the rotor and shaft to the dotted line position of Fig. 2 when the circuit is broken, or certain abnormal conditions occur in the circuit requiring the use of the auxiliary time mechanism. As embodied, a lever 13 is pivotally mounted at 14, and may have a balancing load 15 at one end thereof. The lever abuts near its other end on the protruding end of the rotor shaft 5, and is resiliently held thereto by a spring 16. Thus when proper voltage is supplied and the motor is running at synchronous speed, the end of shaft 5 presses against lever 13 with spring 16 under slight tension. If the working pressure of the motor falls below an amount sufficient to drive the rotor at synchronous speed, by reason of the attendant diminution in the axial pull of the field, the rotor and shaft, under the pressure of spring 16, will move outwardly toward the dotted line position of Fig. 2. After a definite amount of the axial movement, the rotor will be in position to operate the device which releases the auxiliary time mechanism, as later described.

Means are provided for causing the rotational energy of the rotor when the field fails or falls below a certain amount to bring the clock mechanism into action. As embodied, the balance wheel of a clock escapement mechanism is shown at 21, having a projecting pin 20, and a flat spring arm 22 is mounted on a frame, and is provided with a detent 23 adapted to pass into and out of engagement with pin 20 on the escapement, and to impart starting movement to the escapement. The tooth 23 is formed so that when lever 22 is released and lifted away, the tooth will give a flip to pin 20 which will start the escapement oscillating, and when lever 22 moves back to the illustrated position, the swing of the balance wheel will lodge the pin 20 in the bite of the tooth 23. In the embodied form of means for operating spring lever 22, engaging with the inside of the spring arm 22 near its outer end is an arm 25 of a bell-crank lever, which is pivoted at 26. The other arm 27 of the bell-crank lever is positioned so that it will be engaged and moved by the contact face 30 of a cam 28, formed on the outer flat face of the rotor 4, when the rotor is moved into the non-running or de-energized position shown in dotted lines in Fig. 2. Thus the rotational movement and the inertia of the motor are utilized to rock the bell-crank lever and positively start the clock mechanism. A spring 29 acts to hold the bell-crank lever in inoperative position with respect to the detent arm 22, except when the lever is swung by engagement with the head 30 of the cam 28. This movement of the bell-crank lever and the spring arm 22 releases the escapement and gives it an initial swing which insures setting the clock going.

Means are provided for holding the bell-crank lever 25, 27 with the arm 22 out of engagement with the balance wheel 21, to permit the clock mechanism to run until the motor is again running at synchronous speed. In the embodied form of holding means, a detent lever 34 is pivoted at 35, and has a detent tooth 36, which engages and holds a pin 37 on the arm 27 of the bell-crank lever, after the cam 28 has swung the lever to the right in Fig. 1 and has lifted the arm 22 out of engagement with the escapement 21. So long as the detent 36 holds the lever, the clock mechanism is free to run. A spring 38 normally holds lever 34 with its detent 36 in position to engage pin 37 and hold the bell-crank lever. When the cam 28 swings the bell-crank lever to the right in Fig. 1, the pin 37 will ride up over the curved edge 39 of the detent 36, swinging the lever 34 against its spring 38, the pin then falling in behind the detent. The means for rocking lever 34 against its spring 38 to release the bell-crank lever and permit the detent arm 22 to engage the balance wheel 21 and stop the clock is operated as the voltage is restored on the line.

As embodied, a disc 43 is connected to move with the rotor and its shaft, the disc having a pin 44 projecting from its face adapted to engage with the tail end of the lever 34 and release the bell-crank lever. If while the auxiliary time mechanism is running, normal working conditions are restored in the circuit, the rotor 4 and shaft 5 will move axially toward the full line position of Fig. 2, moving against spring 16 until the rotor is in synchronous speed position. Disc 43 is connected to rotate with the rotor and shaft, and pin 44 passes under detent lever 34, and trips it to release lever 25, 27 and to permit the detent 20 to catch and hold the escapement. This rotation of disc 43 is accomplished by any suitable mechanical drive from rotor 4, which drive forms no part of the present invention, and by way of example, may comprise a shaft 45, having a bevel gear 46 on one end, meshing with a gear 46' on shaft 5. These gears engage when the rotor is in the right-hand position, Fig. 2, corresponding to the power-on position. Gears 46 and 46' disengage when the rotor is in the left-hand or power-off position. The other end of shaft 45 carries a worm 47, which drives a worm wheel 47' fixed to shaft 43' on which disc 43 is mounted. The mechanism just described rotates disc 43 to actuate latch arm 34 when the motor starts.

The mechanism may be actuated periodically, apart from its automatic operation due to circuit disturbances, merely for the purpose of keeping it in good condition, as for instance to safeguard against the clock mechanism gumming or sticking, and one way of accomplishing this is by interrupting or varying the current for the synchronous motor. This operation can be very brief and simply sufficient to carry the mechanism through its cycle.

The invention in its broader aspects is not limited to the specific mechanisms shown and described but departures may be made therefrom within the scope of the accompanying claims without departing from the principles of the invention and without sacrificing its chief advantages.

What I claim is:

1. In a time measuring mechanism employing a synchronous motor and an auxiliary time measuring device having an escapement, a synchronous motor having a rotor axially movable relatively to the field, means acting to move the rotor axially from the field on line pressure drop, a releasing device for said escapement, means for actuating said device to release the escapement, and means rotatable with the rotor and brought into position to operate said escapement releasing device by axial movement of the rotor.

2. In a time measuring mechanism employing a synchronous motor and an auxiliary time measuring device having an escapement, in combination a synchronous motor having a rotor axially movable relatively to the field, means acting to move the rotor axially from the field on line pressure drop, a device for stopping said escapement, means for actuating said device to stop the escapement, and means rotatable with the motor and brought into actuating relation with said device by the rotor moving axially into the field.

3. In a time measuring mechanism employing a synchronous motor and an auxiliary time measuring device having an escapement, in combination a synchronous motor having a rotor axially movable relatively to the field, means acting to move the rotor axially from the field on line pressure drop, a device for starting and stopping said escapement, means for actuating said device to start the escapement and rendered operative by the rotor moving axially on line pressure drop, and means for actuating said device to stop the escapement by the rotor starting and coming up to speed.

4. In a time measuring mechanism employing a synchronous motor and an auxiliary time measuring device having an escapement, in combination a synchronous motor having a rotor and its shaft axially movable relatively to the field, means acting to move the rotor axially from the field on line pressure drop, a releasing device for said escapement, means for actuating said device to release the escapement, and a device carried on the rotor shaft and moved into position by axial movement of the shaft on line pressure drop to operate said releasing means.

5. In a time measuring mechanism employing a synchronous motor and an auxiliary time measuring device having an escapement, in combination a synchronous motor having a rotor axially movable relatively to the field, means acting to move the rotor axially from the field on line pressure drop, a device for starting and stopping said escapement, means for actuating said device to start the escapement and rendered operative by the rotor moving axially on line pressure drop, detent means for holding said device in inactive position, and means operated by the rotor starting and coming up to speed for releasing said device and causing it to stop said escapement.

6. In a time measuring mechanism employing a synchronous motor and an auxiliary time measuring device having an escapement, in combination a synchronous motor having an axially movable rotor, means for moving the rotor axially responsively to changes in line pressure, an escapement starting and stopping device including a movable spring arm having a detent adapted to start and stop the escapement balance wheel, a lever for moving said spring arm to start the escapement mechanism, means positionable by axial movement of the rotor due to line pressure drop for actuating said lever to start the escapement, detent means for holding said lever, and means rendered operable by rotation of the rotor under line pressure pick-up for causing said detent to release the lever to permit the arm to stop the escapement.

ALFRED WIEDEMEIER.